(12) United States Patent
Bogacz

(10) Patent No.: US 11,586,774 B1
(45) Date of Patent: *Feb. 21, 2023

(54) SYSTEMS AND METHODS FOR DYNAMIC CHECKSUM GENERATION AND VALIDATION WITH CUSTOMIZABLE LEVELS OF INTEGRITY VERIFICATION

(71) Applicant: Illuscio, Inc., Culver City, CA (US)

(72) Inventor: Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,621

(22) Filed: Jul. 11, 2022

Related U.S. Application Data

(63) Continuation of application No. 17/525,705, filed on Nov. 12, 2021, now Pat. No. 11,386,235.

(51) Int. Cl.
| | |
|---|---|
| H04L 29/06 | (2006.01) |
| G06F 21/64 | (2013.01) |
| G06F 21/56 | (2013.01) |
| G06F 21/62 | (2013.01) |
| G06F 21/60 | (2013.01) |

(52) U.S. Cl.
CPC ............ *G06F 21/64* (2013.01); *G06F 21/565* (2013.01); *G06F 21/602* (2013.01); *G06F 21/6209* (2013.01)

(58) Field of Classification Search
CPC ...... G06F 21/64; G06F 21/565; G06F 21/602; G06F 21/6209
See application file for complete search history.

(56) References Cited

U.S. PATENT DOCUMENTS

| | | | | |
|---|---|---|---|---|
| 6,324,637 | B1 * | 11/2001 | Hamilton | ............ G06F 16/9014 711/216 |
| 7,420,555 | B1 * | 9/2008 | Lee | ......................... G06T 17/00 345/424 |
| 8,032,542 | B2 | 10/2011 | Reynolds | |
| 11,074,703 | B1 | 7/2021 | Monaghan et al. | |

(Continued)

OTHER PUBLICATIONS

Jin, Xin & Wu, Zhaoxing & Song, Chenggen & Zhang, Chunwei & Li, Xiaodong. (2016). 3D Point Cloud Encryption Through Chaotic Mapping. 9916.119-129.10.1007/978-3-319-48890-5_12. (Year: 2016).

(Continued)

*Primary Examiner* — Vance M Little
(74) *Attorney, Agent, or Firm* — Ansari Katiraei LLP; Arman Katiraei; Sadiq Ansari

(57) ABSTRACT

Disclosed is a checksum generation and validation system and associated methods for dynamically generating and validating checksums with customizable levels of integrity verification. The system receives a file with data points defined with positional values and non-positional values, and differentiates a first set of the data points from a second set of the data points. The system generates a checksum based on a combination of two or more values from the positional values and the non-positional values of each data point from the first set of data points, and further based on exclusion of the positional values and the non-positional values of the second set of data points from the checksum. The system may use the checksum to verify the integrity of the data associated with the first set of data points.

20 Claims, 12 Drawing Sheets

(56) References Cited

U.S. PATENT DOCUMENTS

| | | |
|---|---|---|
| 2003/0021441 A1 | 1/2003 | Levy et al. |
| 2003/0076348 A1 | 4/2003 | Najdenovski |
| 2004/0111668 A1* | 6/2004 | Cragun ................ G06F 40/169 715/255 |
| 2007/0180265 A1 | 8/2007 | Hiroshi |
| 2008/0072078 A1 | 3/2008 | Ito |
| 2008/0168564 A1 | 7/2008 | Lerouge et al. |
| 2010/0257994 A1 | 10/2010 | Hufford |
| 2011/0225208 A1* | 9/2011 | Boersma ................ G06T 17/05 715/848 |
| 2016/0088286 A1 | 3/2016 | Forsythe et al. |
| 2017/0295020 A1 | 10/2017 | Moulin et al. |
| 2018/0068091 A1 | 3/2018 | Gaidar et al. |
| 2018/0096551 A1 | 4/2018 | Kraemer et al. |
| 2019/0050296 A1 | 2/2019 | Luo et al. |
| 2019/0197739 A1 | 6/2019 | Sinharoy et al. |
| 2019/0236850 A1 | 8/2019 | Li |
| 2019/0333070 A1 | 10/2019 | Lochan Dass et al. |
| 2020/0019717 A1 | 1/2020 | Steffey et al. |
| 2020/0057861 A1 | 2/2020 | Ujvari |
| 2020/0111237 A1 | 4/2020 | Tourapis et al. |
| 2020/0166366 A1* | 5/2020 | Herman ................ G06V 40/10 |
| 2020/0205723 A1 | 7/2020 | Massey et al. |
| 2020/0219288 A1 | 7/2020 | Joshi et al. |
| 2020/0221125 A1 | 7/2020 | Budagavi et al. |
| 2021/0090328 A1* | 3/2021 | Laddha ................ G06F 16/51 |
| 2021/0095971 A1* | 4/2021 | Mao ................ G06K 9/6267 |

OTHER PUBLICATIONS

A. Jolfaei, X. Wu and V. Muthukkumarasamy, "A 3D Object Encryption Scheme Which Maintains Dimensional and Spatial Stability," in IEEE Transactions on Information Forensics and Security, vol. 10, No. 2, pp. 409-422, Feb. 2015, doi: 10.1109/TIFS.2014.2378146. (Year: 2015).

Yang, X., & Zhang, H. (2016). Encryption of 3D point cloud object with deformed fringe. Advances in Optical Technologies, 2016 doi:http://dx.doi.org/10.1155/2016/4601462 (Year: 2016).

* cited by examiner

SYSTEMS AND METHODS FOR DYNAMIC CHECKSUM GENERATION AND VALIDATION WITH CUSTOMIZABLE LEVELS OF INTEGRITY VERIFICATION

CLAIM OF BENEFIT TO RELATED APPLICATIONS

This application is a continuation of U.S. nonprovisional application Ser. No. 17/525,705 entitled "Systems and Methods for Dynamic Checksum Generation and Validation with Customizable Levels of Integrity Verification", filed Nov. 12, 2021. The contents of application Ser. No. 17/525,705 are hereby incorporated by reference.

BACKGROUND

Checksums may be used to verify data integrity and/or determine whether contents of a file have changed. Common checksum generation algorithms include the Message-Digest algorithm ("MD5"), the family of Secure Hash Algorithms ("SHA"), and the Cyclic Redundancy Check ("CRC") algorithms.

A checksum may be generated by performing a hash or other computation across all data of a file. The checksum is a value of a fixed size that may be used to verify whether any part of the data has changed.

As file sizes grow, generating a checksum from a computation involving all the file data may become computationally expensive, and validating such a checksum may impose too much of a delay in the user experience. Consequently, the one-size-fits-all approach for checksum generation and validation requires updating.

DETAILED DESCRIPTION OF PREFERRED EMBODIMENTS

Figure 1:
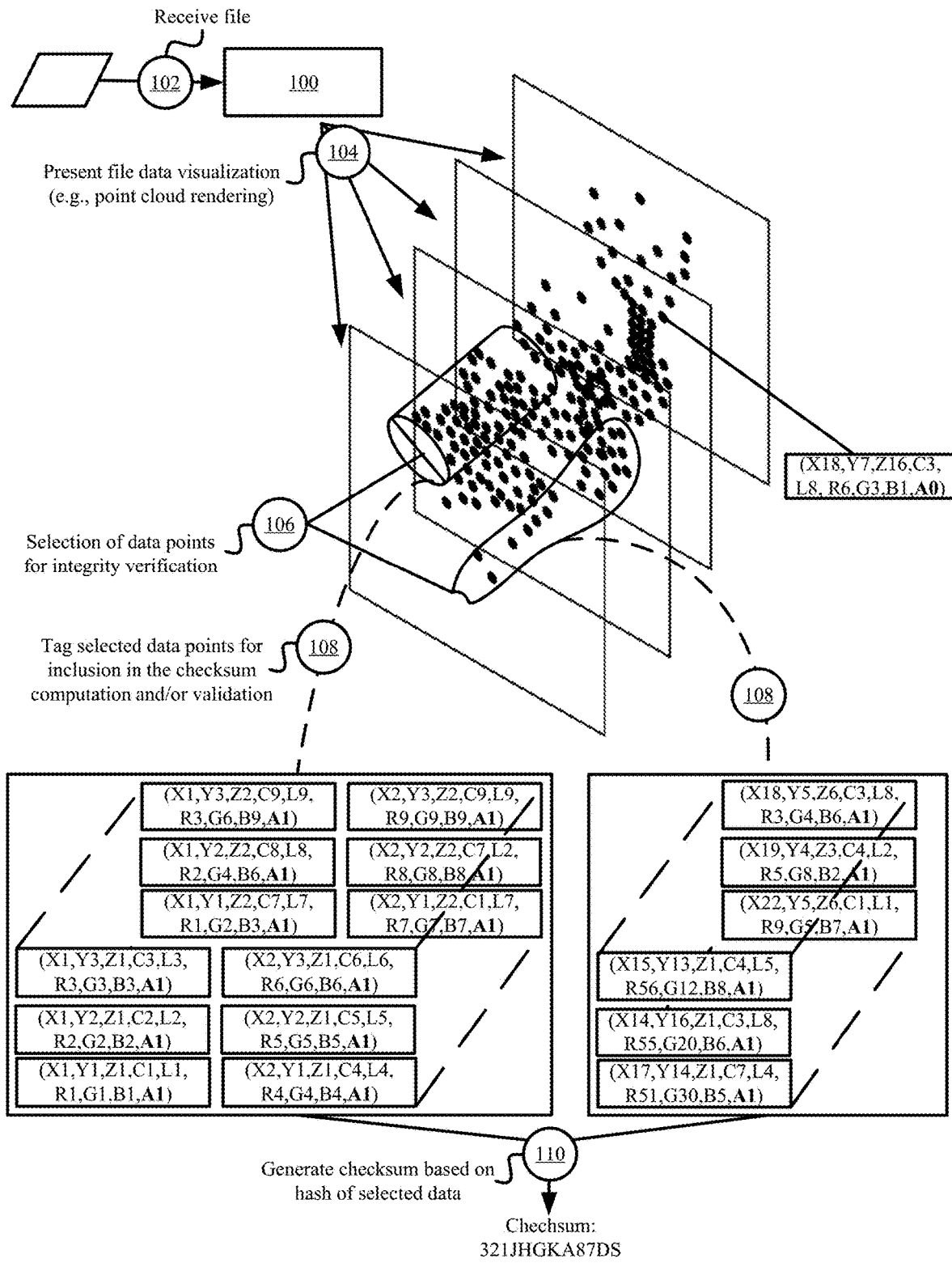
FIG. 1 illustrates an example of the dynamic generation and validation of checksums based on a user-defined level of integrity verification in accordance with some embodiments presented herein.

The following detailed description refers to the accompanying drawings. The same reference numbers in different drawings may identify the same or similar elements.

Provided are systems and methods for dynamically generating and validating checksums with customizable levels of integrity verification. The dynamic checksum generation and validation with the customizable levels of integrity verification may provide efficient data integrity verification for files of different sizes, file with different amounts of data, and/or file containing data with different levels of importance. The systems and methods may include dynamically generating and/or validating checksums based on designated important or critical data from a file with other data from the same file being omitted from the checksum computation and/or validation.

In some embodiments, artificial intelligence and/or machine learning ("AI/ML") may be used to automatically differentiate between and/or classify data from different files, and to dynamically generate different checksums based on different subsets of differentiated and/or classified data from the different files. In some such embodiments, the AI/ML may be trained to identify important data within different files and file types, and to efficiently compute a checksum for preserving the integrity of the important data while omitting the unimportant data from the checksum computation and/or verification. Accordingly, the checksum may be customized for each file based on the contents and/or data of that file so that the checksum may be generated and/or validated in less time than if all the data from the file was included in the checksum, and so that the checksum cannot be regenerated for an altered data set without knowledge of the subset of data that was used for the checksum computation.

In some embodiments, the dynamic generation and validation of checksums may be used to efficiently verify the integrity of large files and/or files containing data with varying levels of importance. Examples of such files may be represented by point clouds.

A point cloud may include data points (e.g., thousands, millions, billions, etc.) in three-dimensional space ("3D") that correspond to imaged points of a 3D object or environment. The point cloud and the individual data points may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. The point cloud may be generated from output of two or more devices. For instance, a first imaging device (e.g., a LiDAR sensor) may determine the position for each data point in 3D space, and a second imaging device (e.g., a high-resolution camera) may measure or capture the visual characteristics or other non-positional information for each data point.

In some embodiments, the point cloud and the individual data points of that point cloud may be computer generated, and may correspond to a digitally created 3D object or environment. In some embodiments, the point cloud may include a combination of imaged real-world objects or environments and digitally created objects or environments.

The point cloud data points may differ from pixels of a two-dimensional ("2D") image, because certain regions of the point cloud may have no data points, lower densities of data points, and/or higher densities of data points based on varying amounts of information that are detected at those regions when imaging a 3D object, volumetric object, or 3D environment. For instance, a point cloud imaging device may capture an object closer to the point cloud imaging device with more data points (e.g., a higher resolution) than if the same object was placed further away from the point cloud imaging device because a greater number of emitted beams (e.g., light, laser, etc.) from the device may make contact with the closer object than the farther object and with measurements from each beam resulting in a different data point of the point cloud. In contrast, pixels of a 2D image have a uniform density and a fixed arrangement defined by the resolution of the 2D image. Moreover, the point cloud data points may have a non-uniform distribution, placement, or positioning, whereas the 2D image has pixel data for each pixel of a defined resolution (e.g., 640×480, 800×600, etc.).

Each point cloud data point may include positional and non-positional values. The positional values may include coordinates within 3D space. For instance, each point cloud data point may include x-coordinate, y-coordinate, and z-coordinate data point values for each imaged point, feature, element, object of the 3D environment. The non-positional values may include values for descriptive characteristics of the data point. The descriptive characteristics may include the visual characteristics of the imaged point, feature, element, or object. The visual characteristics may correspond to a detected color. The color may be represented using red, green, and blue ("RGB") values. In some embodiments, the descriptive characteristics may include the chrominance and/or luminance of the imaged point, feature, element, or object. In some other embodiments, the descriptive characteristics may include properties of the imaging device used to capture the 3D environment. For instance, the descriptive characteristics may include a Tesla strength value to quantify the strength of the magnetic field that was used in detecting and/or imaging a particular point of the 3D environment. In some embodiments, the descriptive characteristics may include energy, audible or sound, and/or other characteristics of the imaging device or the object being imaged. Accordingly, the non-positional values may include any property or descriptive characteristic of the imaged object part (e.g., hue, saturation, brightness, reflectivity, etc.) or of the imaging device used to capture the object part at a corresponding data point in 3D space.

The positional and non-positional values for each particular data point may be stored in an array, and may be associated with that particular data point using some identifier or one or more of the data values. For instance, a point cloud data point may be identified with its x-coordinate, y-coordinate, and z-coordinate values, and non-positional information, such as the red, green, blue, chrominance, luminance, tesla, and/or other values, for that data point may be accessed via a lookup of the x-coordinate, y-coordinate, and z-coordinate values.

Generating and/or validating a checksum using each value (e.g., positional and non-positional value) of millions or billions of data points from a point cloud may take several seconds to complete, and may disrupt the user experience by adding delay to other resource and/or time intensive tasks associated with usage of the point cloud including loading, rendering, editing, and/or processing the point cloud data points. Moreover, some of the data points may correspond to background and/or irrelevant features of the 3D environment represented by the point cloud. The inclusion of these data points and whether they remain static or are changed may have no affect on the primary or important data points or parts of the point cloud. Accordingly, generating a checksum that includes all the values from all the point cloud data points may simply increase the time and cost associated with verifying the point cloud integrity without providing any additional benefit in preserving and/or verifying the integrity of the primary or important data points or parts of the point cloud.

In some embodiments, the dynamic checksum generation and validation may be used in place of the one-size-fits-all approach in which all data from a file is used for the checksum generation and/or validation. The dynamic checksum generation and validation of some embodiments may include generating a checksum based on a subset of the point cloud data points and/or a subset of the values from all or a subset of the point cloud data points based on a custom level of integrity verification specified for that point cloud or file. In doing so, the dynamic checksum generation and validation may focus the integrity verification to the primary or important data points or parts of the point cloud, thereby providing a faster and more efficient methodology to verify the integrity of point clouds, large files, and/or files containing data with varying levels of importance. The dynamic checksum generation and validation may support various manual and automated techniques for customizing the level of integrity verification and/or focusing the integrity verification to different subsets of file data.

FIG. 1 illustrates an example of the dynamic generation and validation of checksums based on a user-defined level of integrity verification in accordance with some embodiments presented herein. Checksum generation and validation system ("CGVS") 100 may receive (at 102) a large file storing a 3D image, object, and/or environment as a point cloud. CGVS 100 may render the point cloud (e.g., render the point cloud data points), and may present (at 104) a visualization of the 3D image, animation, and/or environment on a display or interface.

A user may interact with the visualization and/or interface via keyboard, mouse, touch, and/or other inputs, and may select (at 106) a volume or region within the visualization and/or interface. The user selection may identify the set of point cloud data points that are important and/or that are selected for data integrity verification. In particular, the user selection may encompass a region of 3D space within the 3D image that is rendered from the point cloud, and that includes a set of the point cloud data points.

By rendering the point cloud on the display or interface, the user may visually identify the important parts of the point cloud and/or visually identify the important file data. For instance, the point cloud may include a high resolution scan of a particular component within an overall assembly. The scan may also capture parts of other neighboring components in the assembly, background features, empty space, and/or other features that are unrelated to the particular component. The user selection may include a boundary that is drawn around the particular component and that excludes much of the neighboring components, background, empty space, and/or other features unrelated to the particular component. The user selection may be made via a freeform drawing tool or by inserting and resizing various volumes or shapes into the visualization.

CGVS 100 may determine the set of point cloud data points within the user selection. In some embodiments, CGVS 100 may compute coordinates for the volume or region selected by the user. Computing the coordinates may include mapping the user-defined region to spatial coordinates in the 3D space represented by the presented visualization. CGVS 100 may determine the set of data points that have positional values falling within the coordinates of the selected volume or region.

CGVS 100 may tag (at 108) the set of data points for inclusion or exclusion from the dynamic checksum computation and/or validation. Tagging (at 108) the set of data points may include adding a non-positional value that indicates whether the data point is included as part of the checksum computation. For instance, a value of 0 for the checksum indicator in the non-positional values of a data point may exclude that data point from the checksum computation, whereas a value of 1 may include that data point in the checksum computation. In some embodiments, CGVS 100 may use one or more encoded values to tag (at 108) data points that are included or excluded from the checksum computation. For instance, an even value for the checksum indicator in the non-positional values of a data point may exclude that data point from the checksum computation, and an odd value may include that data point in the checksum computation. The provided tags identify the set of data for the checksum computation, and also the set of data for performing a subsequent validation of a checksum computed for the received file.

CGVS 100 may compute (at 110) a checksum based on one or more of the positional values and/or non-positional values of the set of data points that were selected (at 106) and/or tagged (at 108) for inclusion as part of the checksum computation. Accordingly, CGVS 100 may dynamically compute (at 110) a checksum with a customized level of integrity verification based on the user-identified identified data points of the point cloud. Computing (at 110) the checksum may include performing a hash over the data from each data point of the set of data points, wherein the data may include the various positional and non-positional values associated with each data point of the set of data points. The Message-Digest algorithm ("MD5"), a Secure Hash Algorithm ("SHA"), the Cyclic Redundancy Check ("CRC") algorithm, and/or other algorithms may be used to compute the hash and/or generate the checksum based on the data from the selected set of data points.

The checksum may be included with the point cloud, and may subsequently be used to verify whether any data of the set of data points within the point cloud has changed. For instance, the point cloud with the generated point cloud may be provided over a data network to a different device. The device may run an instance of CGVS 100 that extracts the checksum accompanying the point cloud, that computes a checksum based on the data of the set of data points from the point cloud that are tagged for inclusion as part of the checksum computation, and that compares the extracted checksum to the computed checksum. Any difference between the compared checksums may indicate that one or more data points in the tagged set of data points (e.g., the identified important data for the point cloud) has changed or that one or more values or data from one or more of the tagged set of data points has changed. More generally, any detected change may indicate that the data of the point cloud has been corrupted, altered without authorization, and/or changed such that the accuracy and/or integrity of the data can no longer be trusted or verified.

In some embodiments, the dynamic checksum generation and validation of checksums may support automated techniques for customizing the level of integrity verification. In some such embodiments, the level of integrity verification may be defined based on an algorithmically selected set of data from a file (e.g., a set of data points from a point cloud). For instance, CGVS 100 may select a level of integrity verification for data of a file from different defined levels of integrity verification, and may programmatically select different sets of data from the file to include as part of the checksum generation and validation based on the selected level of integrity verification. Each level of integrity verification may include sampling a different set of data from a file or a different set of data points from a point cloud for the resulting checksum, wherein the sampling includes less than all the data or data points of the file or point cloud.

Figure 2:
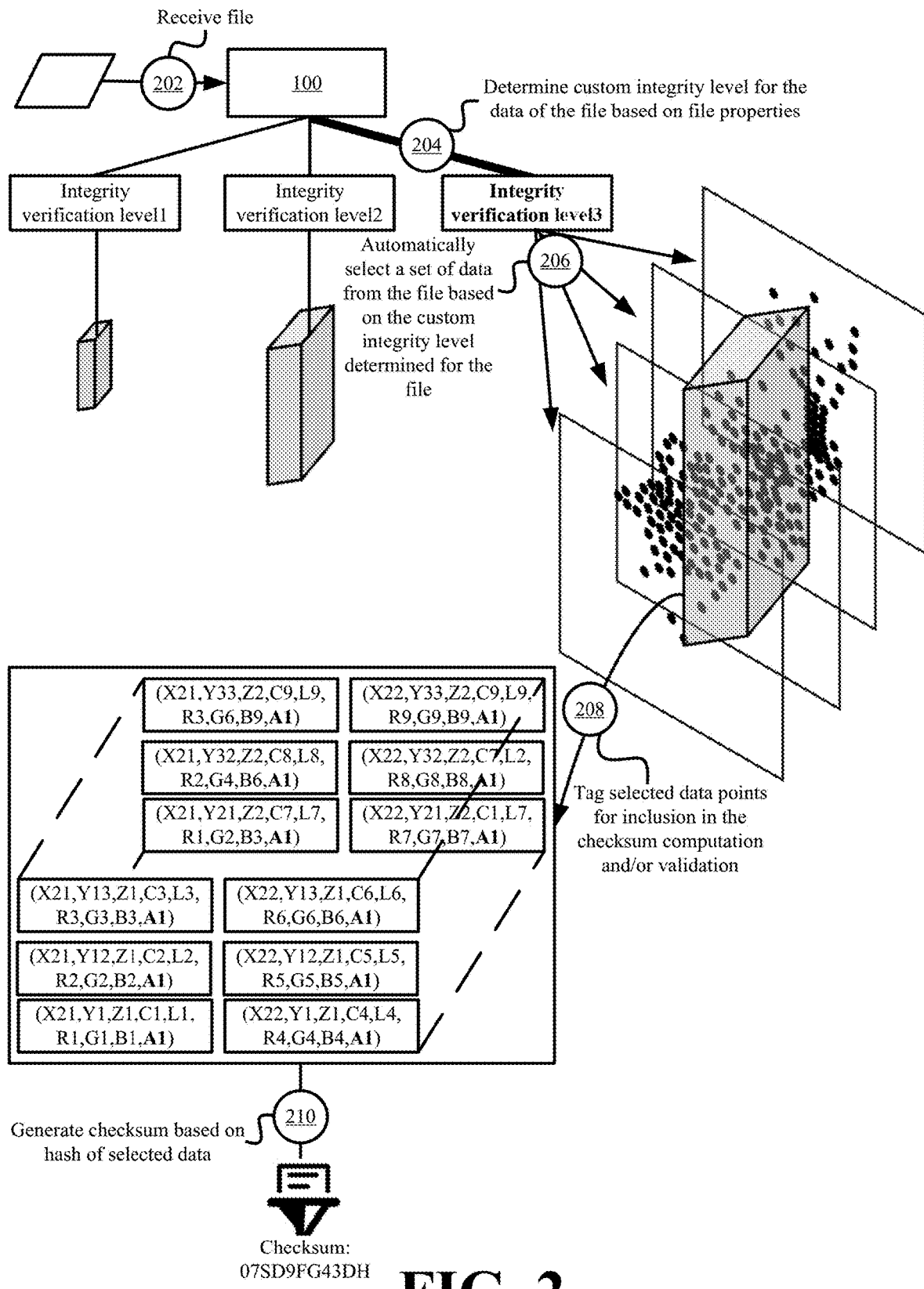
FIG. 2 illustrates an example of the dynamic checksum generation and validation based on a custom level of integrity verification that is specified for a file and a set of data that is automatically selected from the file as a result of the specified custom level of integrity verification in accordance with some embodiments presented herein.

FIG. 2 illustrates an example of the dynamic checksum generation and validation based on a custom level of integrity verification that is specified for a file and a set of data that is automatically selected from the file as a result of the specified custom level of integrity verification in accordance with some embodiments presented herein. As shown in FIG. 2, CGVS 100 may receive (at 202) a file, and may determine (at 204) a level of integrity verification for the data of the file based on one or more properties associated with the file and/or a user selection of a desired level of integrity verification.

In some embodiments, CGVS 100 may be configured to provide different levels of integrity verification for files with different file extensions or different file types. A higher first level of integrity verification may include selecting more or different data from a file for inclusion in the checksum computation and/or validation than a lower second level of integrity verification. For instance, CGVS 100 may be configured to provide the higher first level of integrity verification for documents, images, and/or point clouds than for video and/or audio files where changes to the video and/or audio files may have less of an impact to the overall file and/or presentation of the file than changes to the documents, images, and/or point clouds. As another example, CGVS 100 may inspect the file metadata to determine where the file originated from, and may be configured to provide higher levels of integrity verification for files originating from a first set of sources (e.g., legal and engineering) than for files originating from a second set of sources (e.g., quality assurance and marketing).

Each level of integrity verification may be associated with a different data selection algorithm, methodology, or technique for ensuring the integrity of a different amount or sampling of data from the file. As shown in FIG. 2, CGVS 100 may determine (at 204) a particular level of integrity verification for the received point cloud file that is associated with selecting (at 206) data points within various planes defined from a center point of the point cloud. Specifically, CGVS 100 may identify the center point within the 3D space represented by the point cloud, and may select (at 206) data points that are a first value away from the x-coordinate of the center point, a second value away from the y-coordinate of the center point, and a third value away from the z-coordinate of the center point. Increasing the level of the integrity verification may include increasing one or more of the first value, second value, and third value to increase the number of data points selected for the checksum computation. Decreasing the level of the integrity verification may include decreasing one or more of the first value, second value, and third value to reduce the number of data points selected for the checksum computation.

In some embodiments, CGVS 100 may tag (at 208) each data point of the automatically selected set of data points for inclusion as part of the checksum computation. Tagging (at 208) the set of data points may include changing a non-positional value that is used to identify whether or not a data point is included in the checksum computation.

CGVS 100 may compute (at 210) a checksum based on one or more of the positional values and/or non-positional values of the automatically selected (at 206) and/or tagged (at 208) set of data points. The checksum may be included and/or embedded with the point cloud, and may subsequently be used to verify whether any data of the set of data points within the point cloud has changed.

In some embodiments, CGVS 100 may omit the tagging (at 208) operation, and may dynamically select the set of data from the file at the time of checksum generation and/or validation based on the set of data that CGVS 100 automatically selects from the file as a result of the custom level of integrity verification that CGVS 100 determines for the file using the file properties. In some such embodiments, CGVS 100 may compute (at 210) the checksum by defining the planes and/or volumes from the center point of the point cloud for the particular level of integrity verification, may filter and/or select the set of data points falling within the defined planes and/or volumes, and may generate the checksum based on the data and/or values from the set of data points.

CGVS 100 may include the particular level of integrity verification (e.g., the custom level of integrity verification determined for the file) as a value within the computed checksum. For instance, a two digit or character code representing the particular level of integrity verification may be embedded within the checksum. The code may be extracted from the checksum when performing the data integrity verification, and may be used to identify the particular level of integrity verification that was originally used to compute the checksum and to reselect the set of data points the for recomputing the checksum and for comparing the computed checksum against the included checksum. In some embodiments, the code may be omitted from the computed checksum since CGVS 100 may determine the particular level of integrity verification used for the file directly from the file extension, file type, and/or other properties of the file.

The checksums that were generated with reference to FIG. 1 and FIG. 2 may detect changes that occur within manually selected data, data that is identified as important or critical (via a manual selection, algorithmic selection, or otherwise), and/or data within regions of the file or point cloud defined according to a selected level of integrity verification for the file or point cloud. The resulting checksums may not be used to for integrity verification of data or data points that were not selected and included as part of the checksum computation.

Figure 3:
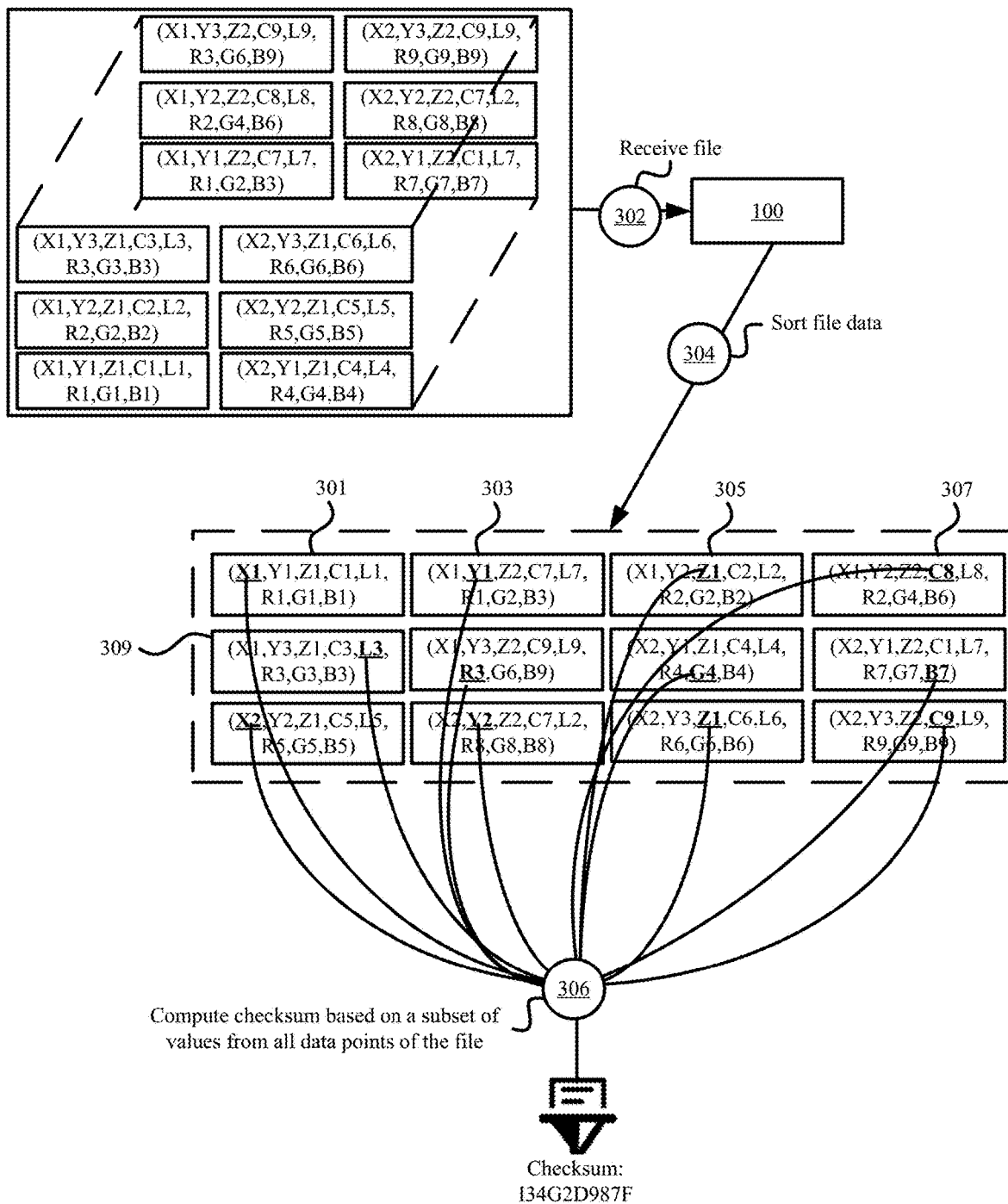
FIG. 3 illustrates an example of dynamic checksum generation and validation for verifying the structure and amount of data in a file without including all the data in the checksum computation or validation in accordance with some embodiments presented herein.

In some embodiments, CGVS 100 may perform a dynamic and efficient computation of a checksum that may be used to verify that no data and/or data points were added or removed from the file and/or point cloud. FIG. 3 illustrates an example of dynamic checksum generation and validation for verifying the structure and amount of data in a file without including all the data in the checksum computation or validation in accordance with some embodiments presented herein. The resulting checksum computed from less than all the data may still be used to verify whether any data points are added or deleted from the point cloud or whether one or more of the data points have changed.

CGVS 100 may receive (at 302) a file that stores a plurality of data points for a point cloud encoding of a 3D image, object, and/or environment. CGVS 100 may sort (at 304) the point cloud data points. The sorting (at 304) may include ordering the data points according to their positional values based on the positional values defining a unique ordering of the data points. The sorting (at 304) may ensure that the subsequent checksum computation may be reproduced because the unique ordering of the data points is preserved if the file and/or point cloud data remains unchanged. The sorting (at 304) may include organizing, arranging, and/or otherwise changing the ordering of the data points in the file. For instance, the data points may be stored and/or accessed from the received (at 302) file in a first order that is not based on the positional values of the data points, and the sorting (at 304) may include organizing, arranging, and/or otherwise changing the ordering of the data points from the first order to a different second order that is based on the positional values of the data points. In some embodiments, the point cloud file format may provide and/or store the data points in the sorted order. For instance, the point cloud file format may store the point cloud data points in arrays based on ascending x-coordinate, y-coordinate, and z-coordinate positional values of the data points.

CGVS 100 may compute (at 306) a checksum for the file using a single positional or non-positional value from each data point of the sorted data points. As shown in FIG. 3, CGVS 100 may select a first value (e.g., x-coordinate value) from the positional and non-positional values of first ordered data point 301, a second value (e.g., y-coordinate value) from the positional and non-positional values of second ordered data point 303 that is adjacent to first ordered data point 301, a third value (e.g., z-coordinate value) from the positional and non-positional values of third ordered data point 305 that is adjacent to second ordered data point 303, a fourth value (e.g., chrominance value) from the positional and non-positional values of fourth ordered data point 307 that is adjacent to third ordered data point 305, a fifth value (e.g., luminance value) from the positional and non-positional values of fifth ordered data point 309 that is adjacent to fourth ordered data point 307, and so on in repeating fashion.

Computing (at 306) the checksum may involve hashing some combination (e.g., summation, concatenation, XOR Boolean operation, etc.) of the selected value or subset of values from each data point in the respective order. For instance, CGVS 100 may XOR the selected first value of first ordered data point 301 with the selected second value of second ordered data point 303 with the selected third value of third ordered data point 305 and so on in the specified order of the data points. The resulting value after XORing the selected values of the data points in the specified ordering of the data points may yield a value that may be used as the checksum, or may yield a value that may be hashed using a hashing function to produce the checksum. In any case, the resulting value after XORing the selected values of the data points in the specified ordering of the data points yields a unique value that changes if the ordering of data points changes (e.g., a data point is moved to a new position, is removed from the point cloud, or is added to the cloud) or if any of the selected values in the ordering changes (e.g., the same selected values are XOR'd together in a different sequence). As another example, CGVS 100 may sum the selected first value of first ordered data point 301 with the selected second value of second ordered data point 303 with the selected third value of third ordered data point 305 and so on in the specified ordering of the data points. CGVS 100 may discard the leading bit or trailing bit of the total resulting after each sum such that a sequence of adding the selected values yields a value that is different than the value obtained from summing the same selected values in a different sequence or order. The resulting value may produce the checksum, or may provide a value that may be hashed using a hashing function to produce the checksum. In some embodiments, CGVS 100 may hash some combination of the same positional value or non-positional value from each data point to generate the checksum.

The resulting checksum may be used to verify that no data points have been added to or removed from the point cloud, that positioning or ordering of the data points has not changed, and/or that the selected value for each data point has not changed. Specifically, any data point that is moved, added, or removed in the point cloud will change the values or the ordering for the values used to compute (at 306) the checksum, and would therefore produce a differing checksum that identifies that some data of the file has changed.

The resulting checksum may provide these and other integrity verifications without the processing effort and/or time needed to compute a checksum based on all values and/or data of all data points. For instance, if each data point includes 10 distinct positional and non-positional values, then the checksum generated via the dynamic sampling of values shown in FIG. 3 may be completed in $\frac{1}{10}^{th}$ the time that it would take to compute the checksum using all values of all data points.

The level of integrity verification may be increased by increasing the number of positional and non-positional values that are sampled from each data point and included in the checksum computation. For instance, rather than use a single value from each data point in the sorted ordering of data points, CGVS 100 may cycle through and sample two or more values from each data point, and may hash some combination of the two or more selected values from each data point to generate a checksum that provides integrity verification for additional values of the data points.

Still some users, point clouds, and/or files may require validation of all data within a point cloud and/or file. CGVS 100 may adapt the dynamic checksum generation and validation to provide integrity verification for the entire dataset and/or all values of all data points that is faster and more efficient than techniques that involve hashing the entire dataset and/or all values of all data points of a point cloud.

Figure 4:
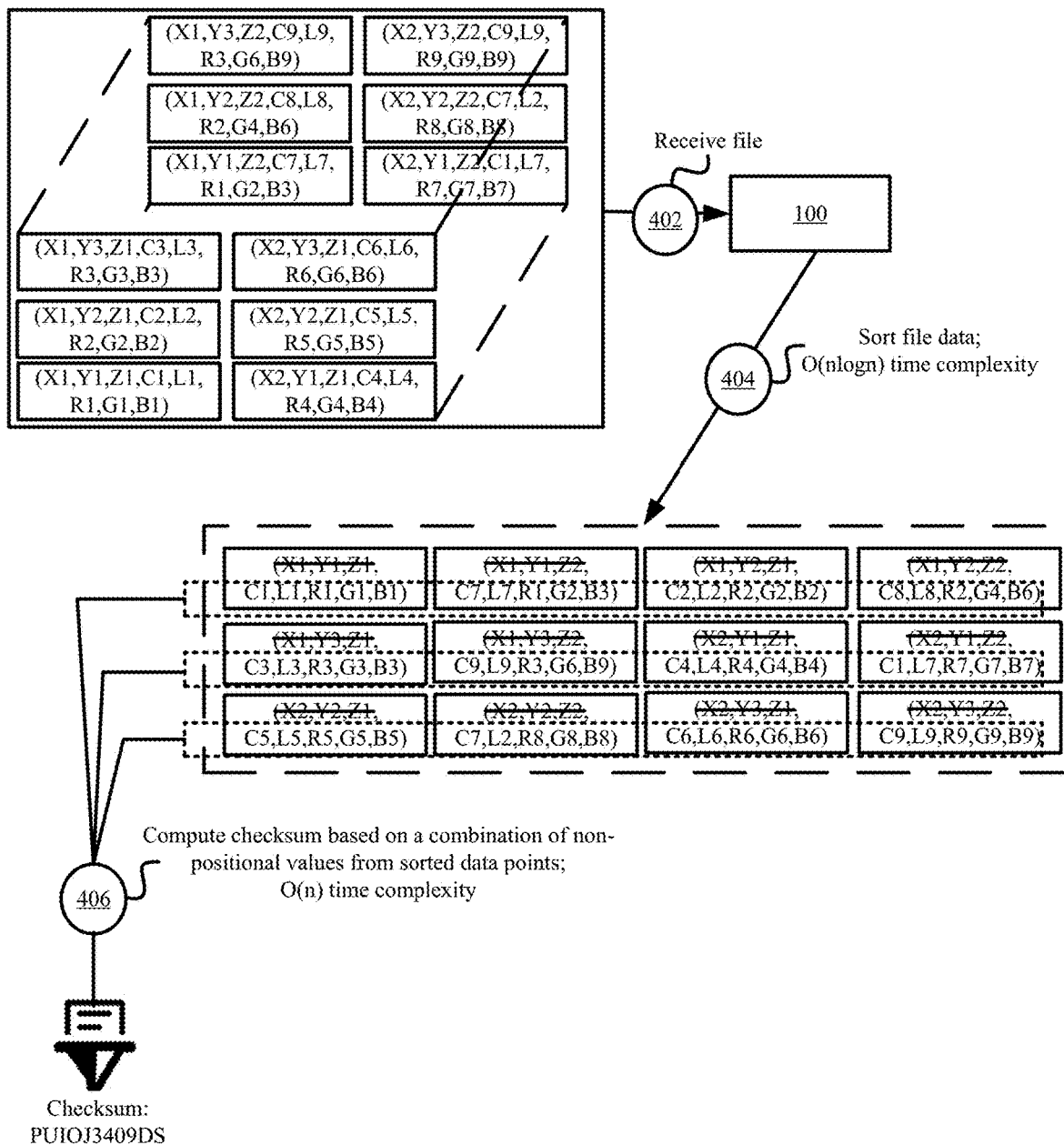
FIG. 4 illustrates an example of the dynamic checksum generation and validation for verifying the integrity of all point cloud data based on a checksum computation involving less than all the point cloud data in accordance with some embodiments presented herein.

FIG. 4 illustrates an example of the dynamic checksum generation and validation for verifying the integrity of all point cloud data based on a checksum computation involving less than all the point cloud data in accordance with some embodiments presented herein. CGVS 100 may receive (at 402) a point cloud and/or a request to generate a checksum for verifying that no data point values or data points within the point cloud have changed.

CGVS 100 may sort (at 404) the point cloud data points according to their positional values. As shown in FIG. 4, the point cloud data points may be ordered first based on ascending x-coordinate positional values, then based on ascending y-coordinate positional values, and then based on ascending z-coordinate positional value. Provided that the point cloud does not have data points defined for the same exact position in 3D space, the sorting may produce a unique ordering for the point cloud data points that is reproducible when no data points are moved, added, or removed from the point cloud. In other words, so long as the integrity of the point cloud does not change, the same ordering for the point cloud data points may be recreated regardless of the order in which the data points are stored in the point cloud file. In some embodiments, the point cloud received by CGVS 100 may have a file format that already stores the point cloud data points in a sorted arrangement.

CGVS 100 may use (at 406) a combination of the non-positional values from each data point in the sorted order to generate a checksum, and may exclude the positional values from each data point from the checksum or the combination of values used to generate the checksum. Nevertheless, the resulting checksum may be used to validate all data of all point cloud data points including their positional values and non-positional values and/or whether any data points have been added or removed from the point cloud.

The computed checksum may be embedded or included with the point cloud, and the integrity for all the point cloud data may be verified by sorting the point cloud data points according to their positional values, computing a new checksum based on the combination of the non-positional values from each data point in the sorted order, and comparing the new checksum to the checksum that was provided with the point cloud to determine if there is any difference. Any change to the positioning of any single data point, to any single non-positional value, or to the number of data points will cause the checksum value to change.

Even when the point cloud data points are not stored in the desired sorted order, the sorting may be performed in less time and with less computational effort than including the positional values of each data point in the hash computation. For instance, the time complexity for sorting via efficient sorting algorithms (e.g., Quick Sort, Merge Sort, etc.) may be as low as O(nlogn), whereas the time complexity for computing the SHA256 hash may be O(n).

In some embodiments, CGVS 100 may further optimize the checksum computation by sorting the data points based on their positional values and a first set of non-positional values, and by computing the checksum based on a hash of some combination of a second set of non-positional values from the sorted ordering of the data points, wherein the second set of non-positional values were not used in the sorting and are different than the first set of non-positional values.

Figure 5:
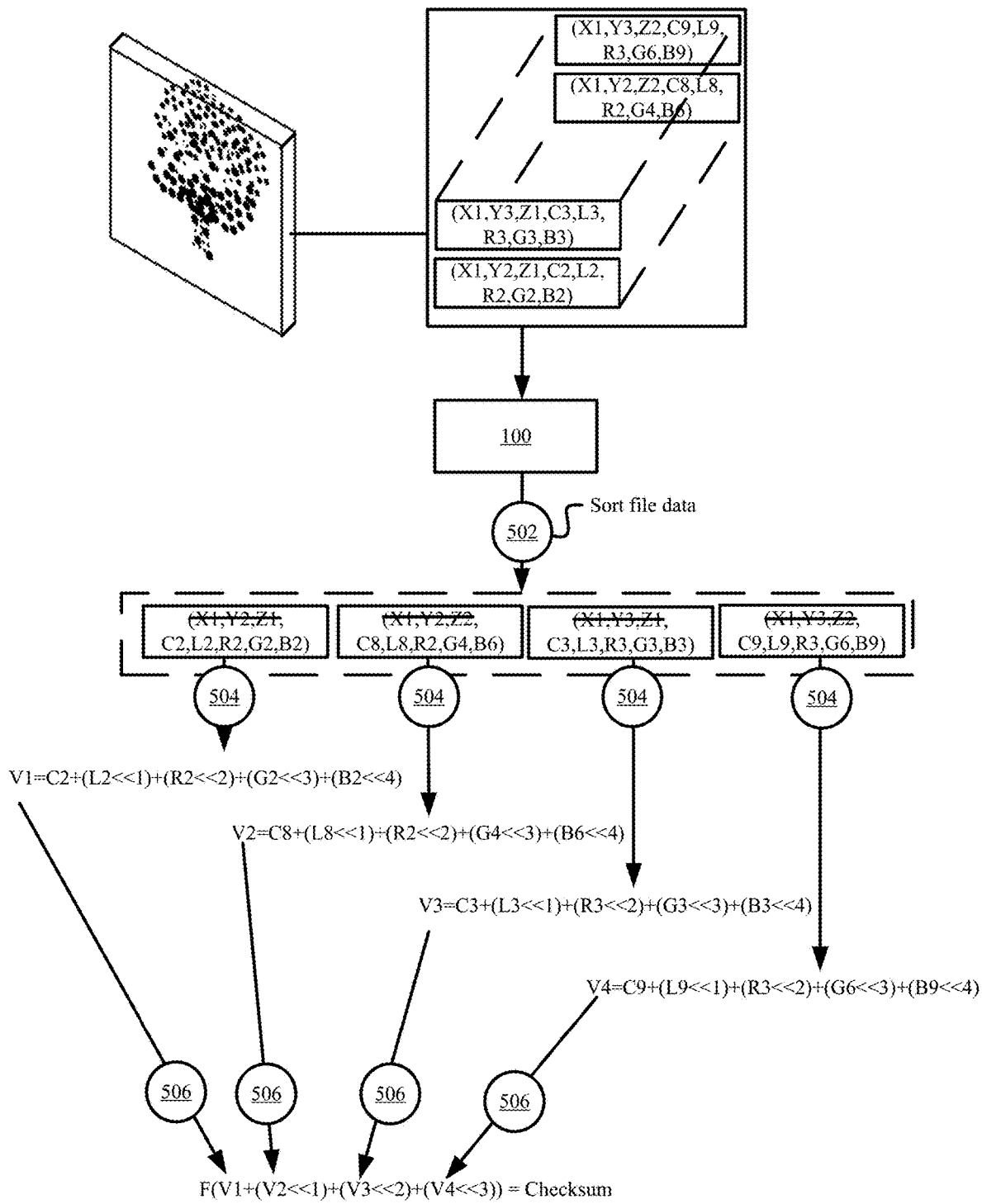
FIG. 5 illustrates an example of generating unique checksums based on a hash of a first set of values from point cloud data points that are sorted according to a second set of values from the point cloud data points in accordance with some embodiments presented herein.

FIG. 5 illustrates an example of generating unique checksums based on a hash of a first set of values from point cloud data points that are sorted according to a second set of values from the point cloud data points in accordance with some embodiments presented herein. As before, sorting (at 502) the data points according to their positional values (e.g., the second set of values) provides a unique ordering for the data points.

CGVS 100 may combine the non-positional values of the sorted data points (e.g., the first set of values) based on their sorted ordering, one or more computations, and/or bitwise operations to produce a unique value. As shown in FIG. 5, CGVS 100 may sum (at 504) a first non-positional value of a first ordered data point to a second non-positional value of the first ordered data point that is bitwise shifted by a first value (e.g., one bit to the left), to a third non-positional value of the first ordered data point that is bitwise shifted by a second value (e.g., two bits to the left or one bit to the right), to a fourth non-positional value of the first ordered data point that is bitwise shifted by a third value (e.g., three bits to the left or two bits to the right, and to a fifth non-positional value of the first ordered data point that is bitwise shifted by a fourth value (e.g., four bits to the left or three bits to the right). CGVS 100 may compute (at 504) the same sum for each data point in the sorted set of data points.

CGVS 100 may then sum (at 506) the first data point resulting value to the second data point resulting value that is bitwise shifted by the first value, to the third data point resulting value that is bitwise shifted by the second value, to the fourth data point resulting value that is bitwise shifted by the third value, and so on. CGVS 100 may discard any leading bit or trailing bits of each value that exceeds a specified number of bits. The resulting value from the sum of all bitwise shifted data point non-positional values may correspond to the checksum, or may be hashed to produce the checksum. If any data point value (e.g., positional or non-positional value), the order of data points, or the number of data points changes, then the resulting sum and/or computed checksum will be different, and the integrity verification of the data, point cloud, and/or file will fail.

Figure 6:
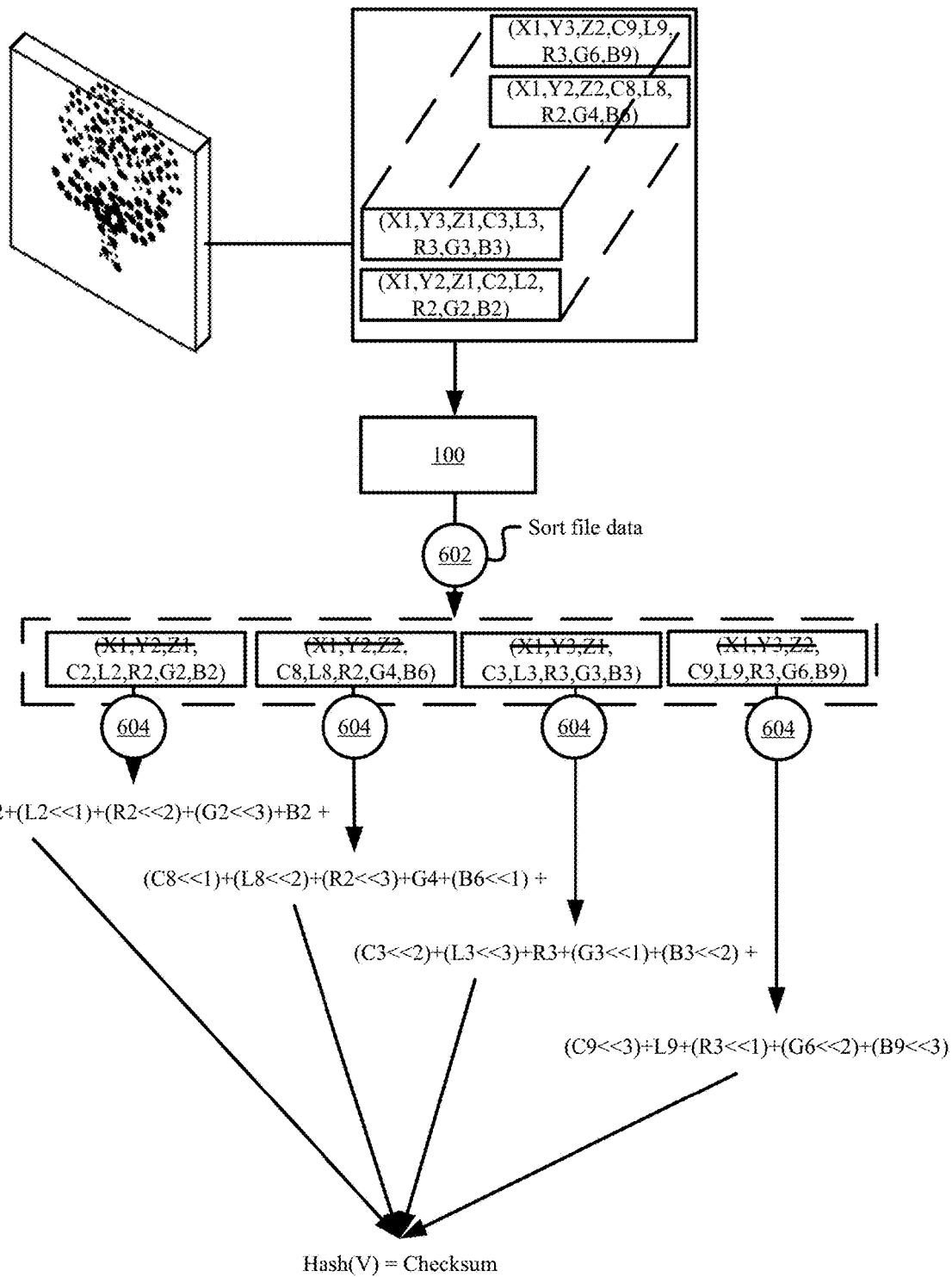
FIG. 6 illustrates another example of generating a unique checksum for verifying the integrity of all data in a file using less than all the data from the file in accordance with some embodiments presented herein.

FIG. 6 illustrates another example of generating a unique checksum for verifying the integrity of all data in a file using less than all the data from the file in accordance with some embodiments presented herein. The checksum generation may include CGVS 100 sorting (at 602) the point cloud data points using a first set of data point values that provide a unique and reproducible ordering for the data points (e.g., the positional values). The checksum generation may further include producing (at 604) a unique combination for a second set of data point values (e.g., the non-positional values) based on the unique ordering produced by the first set of values. As shown in FIG. 6, CGVS 100 may count the number of distinct values in the second set of data point values of each data point, and may select a prime number that is less than the number of distinct values. For instance, if each data point is defined with 5 distinct non-positional values, CGVS 100 may select the prime number 3. CGVS may then sum the second set of values in order with each next value being bitwise shifted by an increasing number of bits up to the selected prime number. For instance, CGVS 100 may add the first non-positional value of the first ordered data point to the second non-positional value of the first ordered data point that is bitwise shifted to the left by 1 bit, to the third non-positional value of the first ordered data point that is bitwise shifted to the left by 2 bits, to the fourth non-positional value of the first ordered data point that is bitwise shifted to the left by 3 bits, to the fifth non-positional value of the first ordered data point that is bitwise shifted to the left by 0 bits, to the first non-positional value of the second ordered data point that is bitwise shifted to the left by 1 bit, and so on.

CGVS 100 may discard any leading or trailing bits after any summation operation where the results exceeds a specified number of bits. For example, the sum from the bitwise shifted non-positional values of a first data point may be 65,500 which is represented as the 16-bit value 1111111111011100, and the addition of a bitwise shifted non-positional value of a next second data point may change the value to 65,600 which may overflow to the 17-bit value of 10000000001000000. Rather than retain the 17-bit value, CGVS 100 may remove the leading bit to produce the 16-bit value of 0000000001000000, or may remove the trailing bit to produce the 16-bit value of 1000000000100000, and may continue the summation operation with the trimmed 16-bit value.

The result is a unique value that cannot be reproduced should any of the values change or the order of the values change. The result may be used as the checksum, or may be hashed to generate the checksum.

In some embodiments, the checksum may be generated via other unique computationally inexpensive combinations of the non-positional values from the data points sorted according to their positional values. For instance, CGVS 100 may sort the data points and may sum the result of XOR'ing the first non-positional value of a first ordered data point to the second non-positional value of a second ordered data point, XOR'ing the second non-positional value of the first ordered data point to the third non-positional value of the second ordered data point, and so on until the sum of all XOR'd pairs of staggered non-positional values from adjacently ordered data points is computed. The resulting value may be used as the checksum or may be hashed to produce the checksum that may be used the verify the integrity of all data from the point cloud or file.

CGVS 100 may use AI/ML to increase the level of integrity verification without increasing the computational cost and/or time associated with generating and/or validating the checksums. In some embodiments, CGVS 100 may train AI/ML techniques to automatically differentiate between data of a first classification and at least a second classification (e.g., important data and unimportant data) within different files and/or between important and unimportant regions within different point clouds. CGVS 100 may dynamically generate and/or validate a checksum based on the AI/ML identified important data and/or important regions. Consequently, the checksum computation and/or validation based on the AI/ML identified important data and/or important regions may be performed more quickly than a checksum computation and/or validation that involves all the file and/or point cloud data, and may provide a checksum that may be used to verify the integrity of the dynamically and reproducibly identified important data and/or the data in the important regions. Changes to the unimportant data and/or the data in the unimportant regions may be of no significance or consequence in the usage of the file and/or point cloud or for the relevant user such that the time and processor savings for computing the dynamic checksum for the AI/ML differentiated data outweighs any integrity loss from not including the unimportant data and/or regions in the checksum computation and/or validation.

Figure 7:
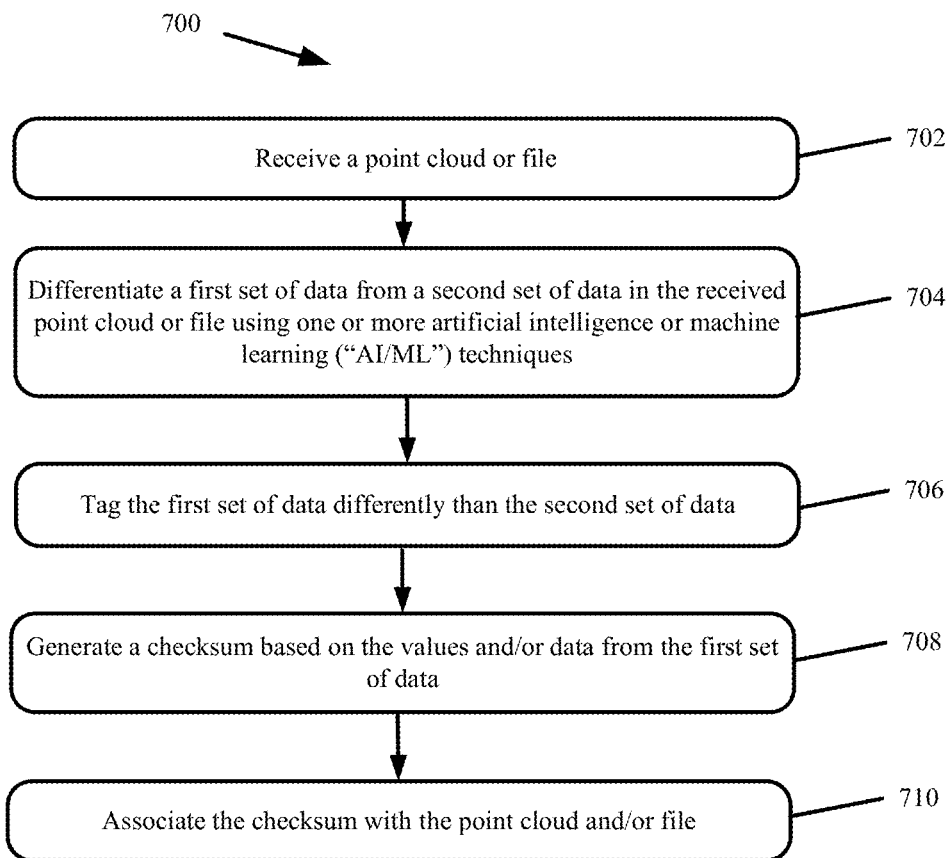
FIG. 7 presents a process for dynamically generating checksums based on automatically identified subsets of data within a point cloud or file in accordance with some embodiments presented herein.

FIG. 7 presents a process 700 for dynamically generating checksums based on automatically identified subsets of data within a point cloud or file in accordance with some embodiments presented herein. Process 700 may be implemented by CGVS 100.

Process 700 may include receiving (at 702) a point cloud or file and/or a request to generate a checksum to verify integrity of a subset of AI/ML classified data from the point cloud or file. In some embodiments, CGVS 100 may compute a dynamic checksum for the important data of the received file when the file size exceeds a threshold limit (e.g., file is larger than one gigabyte in size) or when the file is of a particular type (e.g., a point cloud representing a 3D image or scan of a 3D environment, a video, etc.).

Process 700 may include differentiating (at 704) a first set of data from a second set of data in the received point cloud or file using one or more AI/ML techniques. The first set of data may correspond to point cloud data points or data that the AI/ML techniques classify as being important or integral to the subject matter represented, captured, and/or presented by the point cloud or file. The second set of data may correspond to point cloud data points or data that the AI/ML techniques classify as being unimportant or not integral to the subject matter represented, captured, and/or presented by the point cloud or file. In other words, the AI/ML techniques may classify the first set of data as data that cannot be changed without changing the subject matter that is being presented, whereas changes to the second set of data may not affect or impact the subject matter that is being presented.

Process 700 may include tagging (at 706) the first set of data differently than the second set of data. For instance, CGVS 100 may add a first non-positional value to the data points within the first set of data, and a second non-positional value to the data points within the second set of data to differentiate between the two data sets.

Process 700 may include generating (at 708) a checksum based on the values and/or data from the first set of data while omitting the second set of data from the checksum generation. Generating (at 708) the checksum may include performing a hash based on some combination of one or more values and/or data from the first set of data. The combination may include summing the values from the first set of data in a specified order (e.g., the order in which the first set of data is encoded or formatted within the file, a sorted order based on positional values of the first of data, or another order that may be recreated when the first set of data remains unchanged). The resulting value from the combination may be hashed using a hash function to produce the checksum.

Process 700 may include associating (at 710) the checksum with the point cloud and/or file. In some embodiments, CGVS 100 may embed the checksum as part of the point cloud and/or file, or may link the checksum to the point cloud and/or file so that whenever the point cloud and/or file is accessed, the checksum for that point cloud and/or file may be accessed and/or retrieved beforehand to validate the integrity of the point cloud and/or file.

In some embodiments, CGVS 100 may train the AI/ML techniques to differentiate between a first classification and a second classification (e.g., important data and unimportant data) based on different commonality, patterns, and/or trends that are present in the positional and non-positional values of point cloud data points, and/or filenames, file types, and metadata associated with the file. For instance, the AI/ML techniques may be trained to detect commonality, patterns, and/or trends that differentiate between tight clusters of data points and sparse clusters of data points, foreground data points and background data points, data points with different commonality in the color components, etc.

In some embodiments, the AI/ML techniques may be provided examples of point clouds in which certain dense clusters of data points in the examples are labeled as important data or with a first classification and other less dense clusters of data points are not labeled or are labeled as unimportant data or with a second classification. The AI/ML techniques may analyze the positional values and/or non-positional values of the data points to determine that the data points labeled as the important data are within a threshold distance from at least one neighboring data point, whereas the data points labeled as the unimportant data are more than the threshold distance from a closest neighboring data point. Accordingly, the AI/ML techniques may detect similar commonality in the positional values of data points from an unlabeled point cloud, and may use the presence or absence of such commonality to differentiate between the important and unimportant data of that point cloud.

In some embodiments, the AI/ML techniques may perform unsupervised learning over example point clouds that are not labeled to differentiate between important and unimportant data. In some such embodiments, the AI/ML techniques may be configured to analyze the positional values of the data points and to detect different commonality, patterns, and/or trends in the positional values. For instance, the AI/ML techniques may detect different patterns between a first set of data points that are clustered together and are within a threshold distance from at least one neighboring data point, and a second set of data points that are more than the threshold distance from a closest neighboring data point. The AI/ML techniques may classify each set of data points differently based on the positional differentiation discovered from the analysis, and may determine that the tight clustering of data points may represent important data and/or foreground data and that sparse clustering of data points may represent unimportant data and/or background data based a high number of tracked user edits that occur to the densely clustered data points and a low number of tracked user edits that occur the sparsely clustered data points and/or other criteria that the AI/ML discover from monitoring the example point clouds and/or from other commonality, patterns, and/or trends detected within or from usage of the point clouds.

In some embodiments, the AI/ML techniques may analyze the positional value and the non-positional values of the point cloud data points to differentiate between different objects. For instance, data points that are within a first threshold of one another, that produce a non-planar shape, that have color components that are within a second threshold of one another (e.g., red color values between neighboring data points changes by less than 15%), and/or that have color components that are different than repeating background color components may be determined to be part of the same object. These differentiated objects may be classified as important data, whereas data points with the background color components may be classified as unimportant data.

The AI/ML techniques may differentiate between different objects and/or objects and background elements based on models for edge detection and/or continuous surface detection. Edge detection and/or continuous surface detection models may identify commonality, patterns, and/or trends in the positional and/or non-positional values by which an edge of an object or a continuous surface of an object may be detected and differentiated. For instance, data points with color components within a threshold range of one another may be part of a continuous surface, and data points that have color component similarity with data points on a first side and that have color component dissimilarity with data points on an opposite second side may be classified as edge data points that represent an edge and/or end of an object.

In some embodiments, the AI/ML techniques may use the filename, file type, and/or metadata to assist in the differentiation between the important data and the unimportant data. For instance, the filename and/or metadata may identify that the file includes data for a particular vehicle. The AI/ML techniques may search a database, the Internet, and/or other sources to obtain information (e.g., shape, dimensions, coloring, etc.) about the particular vehicle, and may analyze the file to differentiate the important data pertaining to the particular vehicle from other unimportant data (e.g., background data points, data points for other unrelated objects, etc.).

Figure 8:
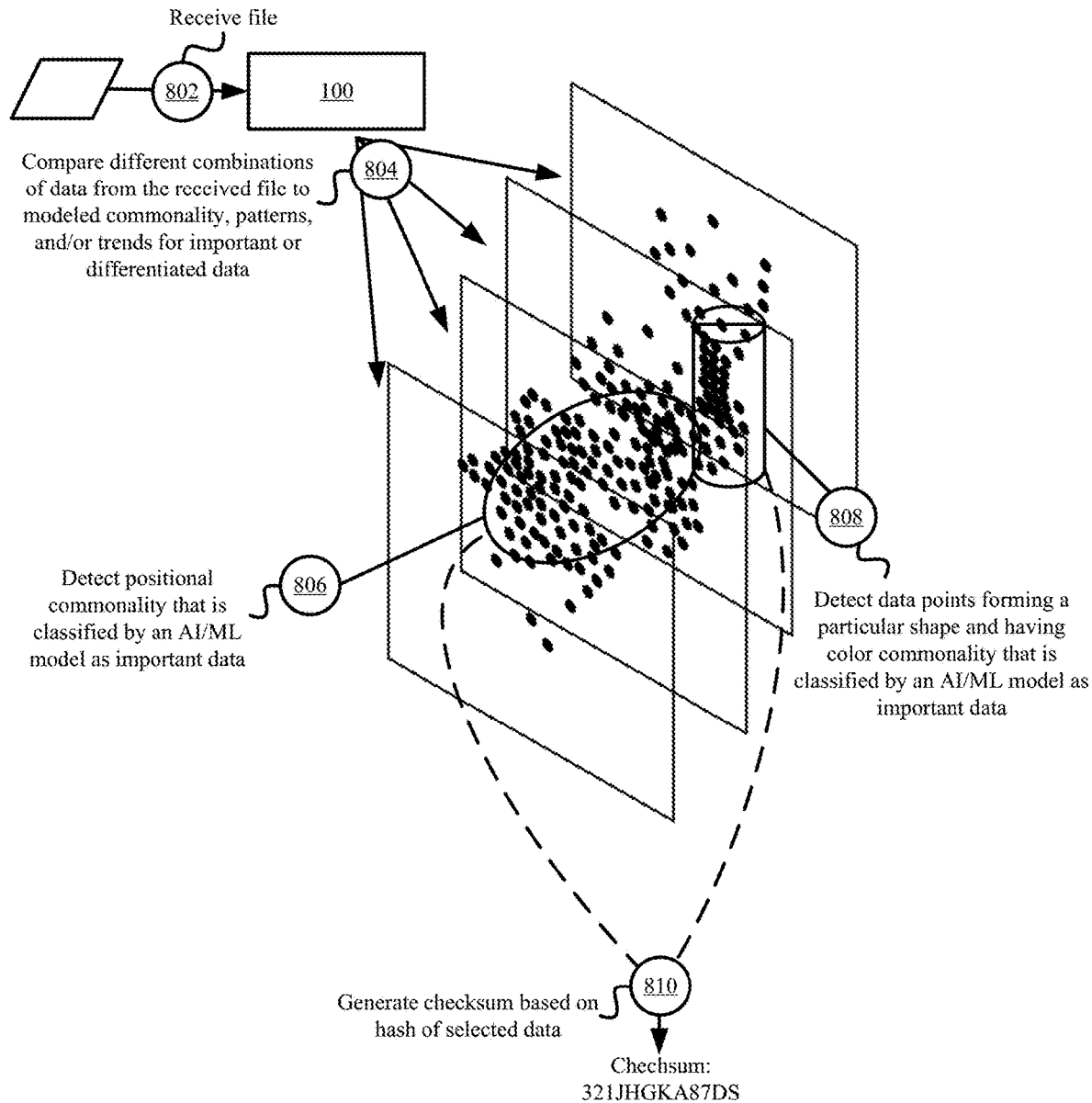
FIG. 8 illustrates examples of automatic file data differentiation in accordance with some embodiments presented herein.

FIG. 8 illustrates examples of AI/ML differentiation of file data for the dynamic checksum generation in accordance with some embodiments presented herein. As shown in FIG. 8, CGVS 100 may receive (at 802) an unclassified point cloud, and may use one or more AI/ML techniques to differentiate between the important and unimportant data within the point cloud.

The one or more AI/ML techniques may be trained to recognize certain commonality, patterns, and/or trends of important data. The AI/ML techniques may define models for the commonality, patterns, and/or trends in the data point positional values and/or non-positional values that differentiate the important data from the other data. CGVS 100 may compare (at 804) different combinations of data points from the received (at 802) point cloud to the AI/ML generated models to determine if any combination contains the modeled commonality, patterns, and/or trends for classification as important or differentiated data.

As shown in FIG. 7, a first AI/ML technique may classify (at 806) a first set of data points as important data based on the first set of data points having positional commonality that matches a modeling of a dense cluster of data points that is classified by the AI/ML models as important or differentiated data. CGVS 100 may differentiate (at 806) the first set of data points from other sets of data points in the point cloud. The differentiation (at 806) may include tagging the first set of data points in the dense concentrations differently than other data points of the point cloud.

A second AI/ML technique may detect (at 808) a second set of data points forming a particular shape and/or having similar color components as modeled important data, and may differentiate (at 808) the second set of data points from other data points in the point cloud. For instance, the file metadata may identify the point cloud as a landscape image, and CGVS 100 may retrieve AI/ML generated models that are trained to detect forms, patterns, and/or characteristics of important features within landscape imaging. CGVS 100 may use the AI/ML generated models to detect (at 808) that the second set of data points form the shape and have the color components for a tree trunk and tree branches that are classified in the models as important or differentiated data.

CGVS 100 may compute (at 810) a checksum using the values of the first set of data points and the second set of data points. Values of other data points in the received (at 802) point cloud may be excluded from the checksum computation.

In some embodiments, user input may be used to train the AI/ML techniques in the differentiation of important data from unimportant data. For instance, CGVS 100 may present a visualization of a point cloud, and the user may select one or more points within the point cloud that represent important data. The AI/ML techniques may then perform an outward expansion from the user selected points to further select any neighboring and/or surrounding data points that have certain positional and/or non-positional value commonality with the user-selected point. For instance, CGVS 100 may identify all the data points that form the same feature or a continuous feature that includes a user-selected point. Accordingly, the user may select a single data point in the point cloud, and the AI/ML techniques may determine and select the set of data points that are part of the same feature or object and/or that share other positional and/or non-positional value commonality with the user-selected data point.

To mitigate the potential of incorrectly classifying data within a file and important data from the checksum computation, CGVS 100 may implement a hybrid approach to generating a checksum by using one or more AI/ML techniques to automatically select a first set of data for the checksum and a sampling of a non-selected second set of data for the checksum. The resulting checksum may be used to verify the integrity of all values and/or data from the first set of data (e.g., classified as important data, foreground data, and/or with a first classification) and the values and/or data from a subset of the second set of data (e.g., classified as unimportant data, background data, and/or with a second classification).

Figure 9:
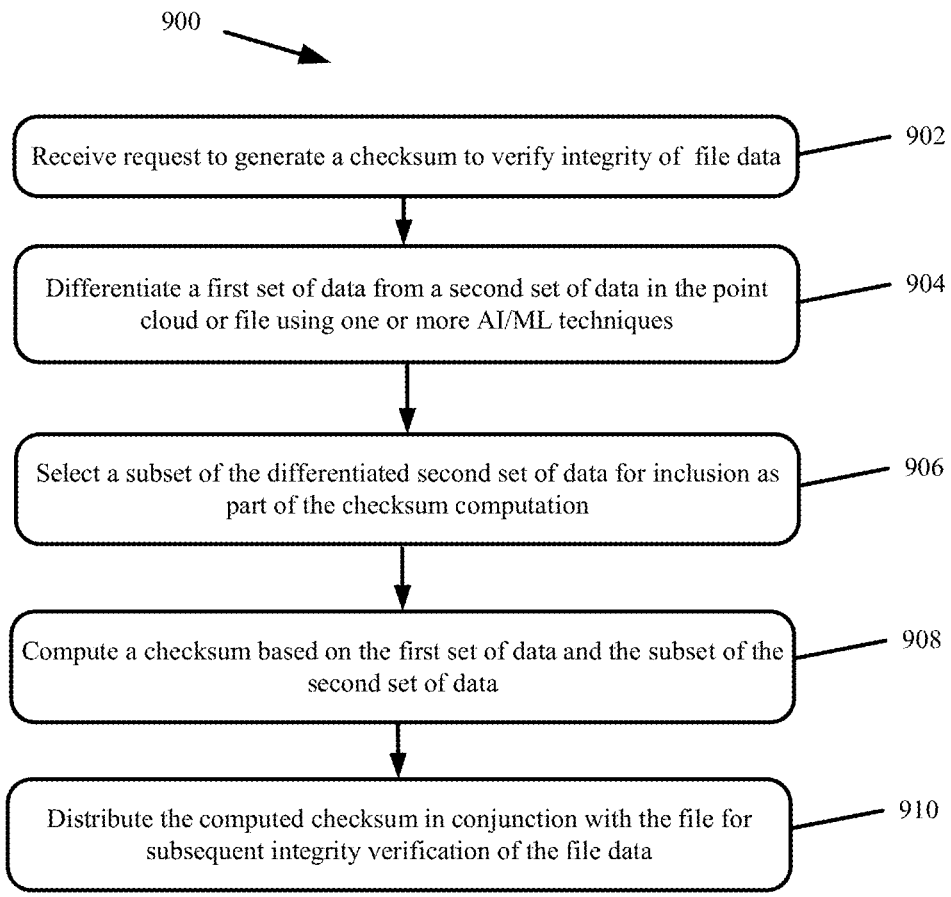
FIG. 9 presents a process for the dynamic checksum generation based on a hybrid selection of important data and a sampling of unimportant data from a file in accordance with some embodiments presented herein.

FIG. 9 presents a process 900 for the dynamic checksum generation based on a hybrid selection of important data and a sampling of unimportant data from a file in accordance with some embodiments presented herein. Process 900 may be implemented by CGVS 100.

Process 900 may include receiving (at 902) a file and/or request a request to generate a checksum to verify integrity of the file data. Process 900 may include differentiating (at 904) a first set of data from a second set of data in the received file using one or more AI/ML techniques. Here again, the AI/ML techniques may differentiate (at 904) the file data based on different commonality, patterns, and/or trends that the AI/ML is trained to detect within the file data (e.g., the positional values and/or non-positional values of point cloud data points). More specifically, the AI/ML techniques may differentiate (at 904) between commonality, patterns, and/or trends in first data that is classified as being important and/or impactful to the subject matter of the file if changed from second data that is classified as being unimportant and/or not impactful to the subject matter of the file if changed.

Process 900 may include selecting (at 906) a subset of the differentiated second set of data for inclusion as part of the checksum computation. The selection (at 906) may include sampling less than all the data from the second set of data in a manner that is reproducible for checksum validation, provided that the file data does not change from when the original checksum is computed to when the checksum is validated. For instance, CGVS 100 may use one or more of the methodologies described above with references to FIGS. 1-5 and/or other described sampling methodologies described herein to select (at 906) the subset of the differentiated second set of data. In some embodiments, selecting (at 906) the subset of data may include selecting every other or third data point from the differentiated second set of data. In some embodiments, selecting (at 906) the subset of data may include selecting a subset of values from the positional values and/or non-positional values of the second set of data to include as part of the checksum computation while selecting all values from the positional values and/or non-positional values of the first set of point cloud data points representing the first set of data to include as part of the checksum computation.

In some embodiments, differentiating (at 904) the data and selecting (at 906) the subset of data may include tagging each data point included within the first set of data and each data point included within the subset of the second set of data with a particular value that indicates inclusion of that data point in the checksum computation. All other data may not be tagged with the particular value or may be tagged with a different value that indicates exclusion of that data or those data points from the checksum computation.

Process 900 may include computing (at 908) a checksum based on the first set of data and the subset of the second set of data. The checksum computation (at 908) may involve using all or less than all of the values and/or data from the first set of data and the subset of the second set of data. For instance, the file data may correspond to point cloud data points having a set of positional and non-positional values, and the checksum computation (at 908) may be based on a combination of some or all of the positional and non-positional values from the first set of data and the subset of the second set of data.

Figure 10:
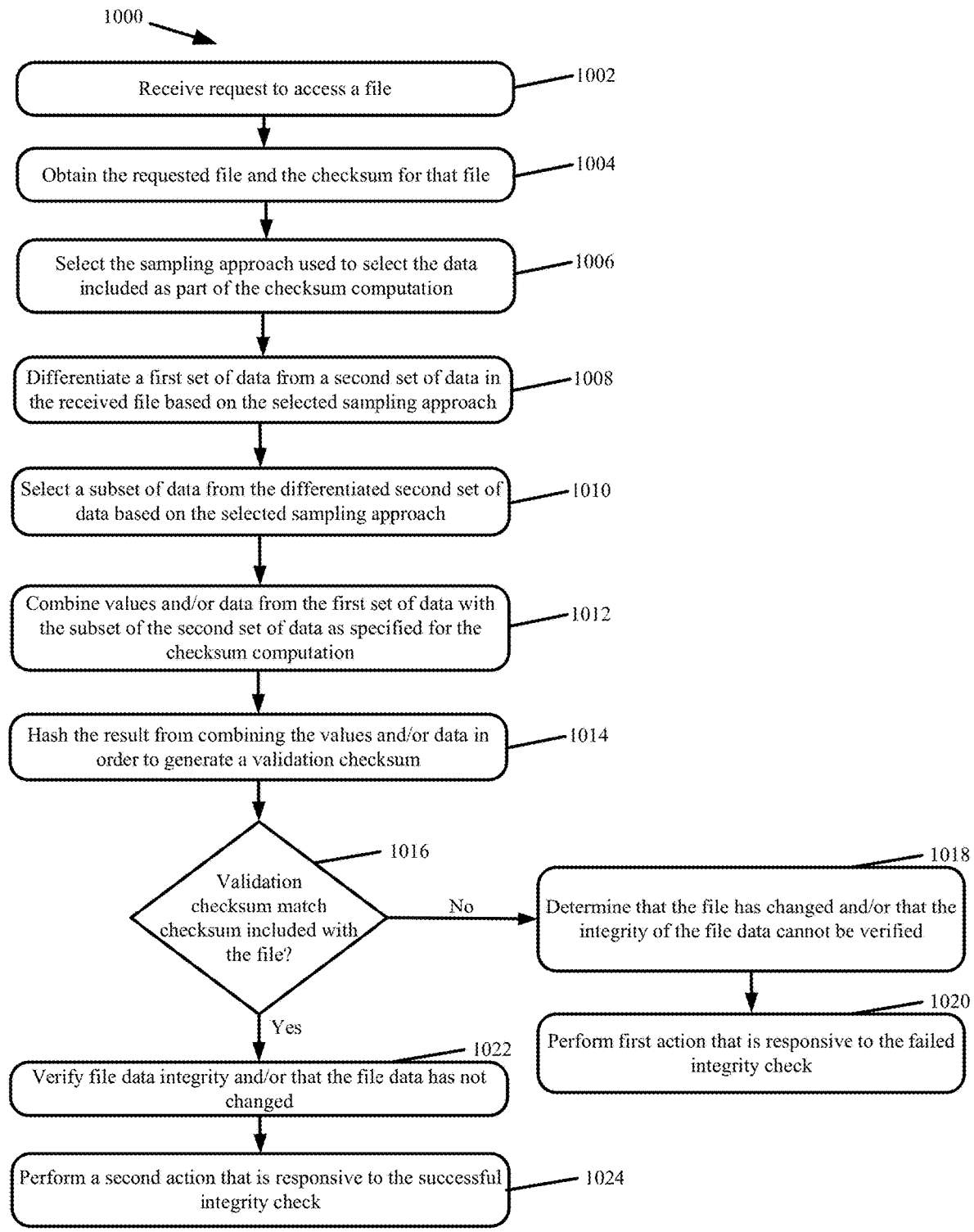
FIG. 10 presents a process for the dynamic checksum validation in accordance with some embodiments presented herein.

Process 900 may include distributing (at 910) the computed checksum in conjunction with the file so that the checksum may be used to verify the integrity of the first set of data and the subset of the second set of data. FIG. 10 presents a process 1000 for the dynamic checksum validation in accordance with some embodiments presented herein. Process 1000 may be performed by the same or different instance of CGVS 100 that was used to generate the checksum that is distributed with a file. In some embodiments, process 1000 may be performed with CGVS 100 integrated as part of a file system or an application that performs a checksum validation before opening or accessing files with an included checksum.

Process 1000 may include receiving (at 1002) a request to access a file. In response to the request, process 1000 may include obtaining (at 1004) the requested file and the checksum for that file. The checksum may be embedded, distributed with, or otherwise linked to the file.

Process 1000 may include selecting (at 1006) the sampling approach used to select the data included as part of the checksum computation. The selection (at 1006) may be based on one or more of a static checksum generation configuration for CGVS 100, the filename, the file type, the file metadata, and/or properties associated with the checksum. For instance, the first two bits or the last two bits of the included checksum may identify the sampling approach as one of the methodologies described with reference to the earlier figures. In this case, the sampling approach may correspond to the hybrid selection of important data and the sampling of unimportant data used for the checksum generation in process 900. In some embodiments, all instances of CGVS 100 may be configured to perform checksum generation and validation based on the hybrid approach of process 900 or another statically configured approach.

Process 1000 may include differentiating (at 1008) a first set of data from a second set of data in the received file and/or sampling (at 1010) a subset of data from the differentiated second set of data based on one or more AI/ML and/or sampling techniques associated with the selected (at 1006) sampling approach. The first set of data and the subset of the second set of data will be the same as the data that was used to compute the checksum included with the file if the file and/or file data has not changed.

To verify whether the file data has changed or not, process 1000 may include combining (at 1012) values and/or data from the first set of data with the subset of the second set of data as specified for the checksum computation. For instance, combining (at 1012) the values and/or data may include sorting the data according to their positional values and summing one or more non-positional values from the sorted data with any bitwise shift operations and/or overflow correction operations.

Process 1000 may include hashing (at 1014) the result from combining (at 1012) the values and/or data in order to generate a validation checksum. Process 1000 may include comparing the validation checksum to the checksum included with the file. The comparison may include determining (at 1016) whether the values of the two checksums match or differ.

In response to the validation checksum differing (at 1016—No) from the included checksum, process 1000 may include determining (at 1018) that the file has changed and/or that the integrity of the file data cannot be verified. Accordingly, process 1000 may include performing (at 1020) at least a first action that is responsive to the failed integrity check. In some embodiments, performing (at 1020) the first action may include blocking access to the file as a result of the integrity check revealing that the file data has changed. In some embodiments, performing (at 1020) the first action may include generating notifications that alert a user as to the failed integrity check, and/or retrieving the file from a different trusted source.

In response to the validation checksum matching (at 1016—Yes) the included checksum, process 1000 may include verifying (at 1022) the integrity of the file data and/or confirming that the verified data has not changed. Accordingly, process 1000 may include performing (at 1024) at least a second action that is responsive to the successful integrity check. In some embodiments, performing (at 1024) the second action may include opening, processing, and/or otherwise providing access to the file.

Figure 11:
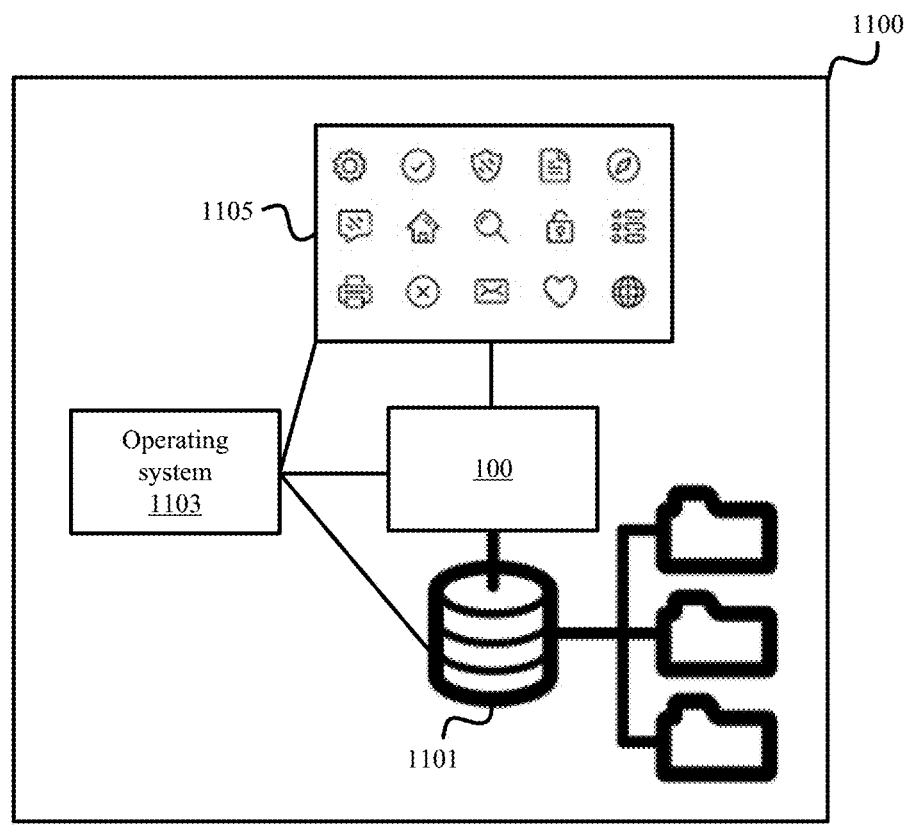
FIG. 11 illustrates one or more integrations of the checksum generation and validation system as part of a device in accordance with some embodiments presented herein.

FIG. 11 illustrates one or more integrations of CGVS 100 as part of device 1100 in accordance with some embodiments presented herein. Device 1100 may include a computer, tablet, smartphone, sensor, Internet-of-Thing ("IoT") device, and/or other apparatus that access or use files and/or data.

As shown in FIG. 11, CGVS 100 may be integrated as part of device file system 1101 and/or operating system 1103. As part of file system 1101 and/or operating system 1103, CGVS 100 may validate the integrity of all or certain files that have checksums before permitting access to those files. In this manner, CGVS 100 may safeguard device 1100 from malicious, altered, unverified, and/or downloaded content. Additionally, CGVS 100 may automatically generate and associate a checksum to each file if the file is newly created, stored, and/or is not already associated with a checksum. In doing so, CGVS 100 may verify that a stored file has not been corrupted after storage on the device and/or before a next access of that file.

In some embodiments, CGVS 100 may be integrated as part of different applications 1105 that execute on device 1100. For instance, a point cloud creation, rendering, and/or editing application 1105 may be integrated with CGVS 100 to verify the integrity of any point cloud loaded or run using that application 1105. Similarly, CGVS 100 may dynamically generate a checksum for point clouds created, edited, or otherwise modified using application 1105, and may include the generated checksum with the modified point cloud. In other words, CGVS 100 may generate a new checksum and/or update the existing checksum of a file whenever that file is changed using one of applications 1105.

Figure 12:
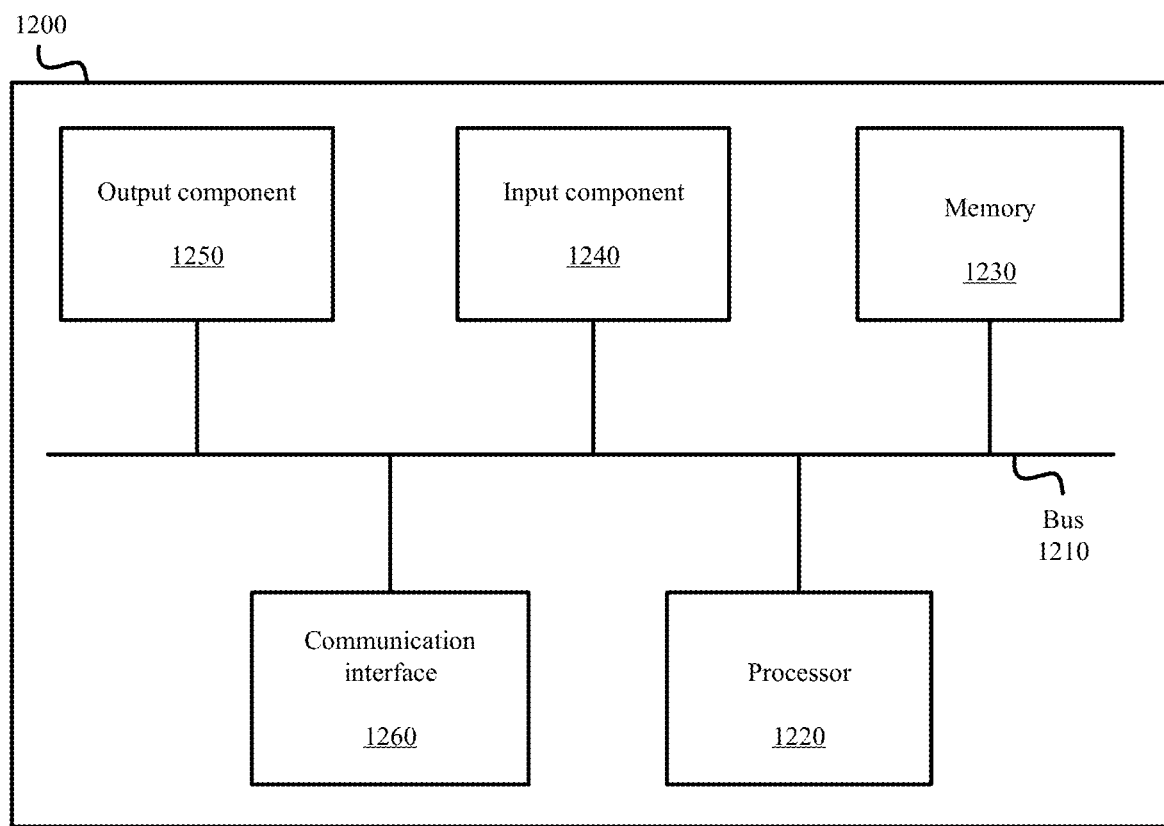
FIG. 12 illustrates example components of one or more devices, according to one or more embodiments described herein.

FIG. 12 is a diagram of example components of device 1200. Device 1200 may be used to implement one or more of the devices or systems described above (e.g., CGVS 100, device 1100, etc.). Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more LEDs, etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving a file comprising a set of data points that are distributed in a multi-dimensional space, wherein each data point of the set of data points comprises (i) a first plurality of elements that define a particular position of the data point in the multi-dimensional space, and (ii) a second plurality of elements that define visual characteristics of the data point;
selecting a set of two or more elements from at least one of the first plurality of elements and the second plurality of elements;
computing a checksum based on a combination of values defined for the set of two or more elements of each data point in the set of data points; and
verifying integrity of the file using the checksum.

2. The method of claim 1,
wherein selecting the set of two or more elements comprises selecting two or more different elements from different subsets of data points in the set of data points, wherein each subset of the different subsets of data points comprises two or more data points that are positioned next to each other in the multi-dimensional space; and
wherein computing the checksum comprises computing the checksum based on the combination of values from the two or more different elements selected for the different subsets of data points, wherein the checksum changes in response to a data point being added to, removed from, or modified in the set of data points.

3. The method of claim 2, wherein selecting the two or more different elements comprises:
cycling between selecting at least a first element or a second element of the set of two or more elements for each data point in one subset of the different subsets of data points.

4. The method of claim 2, wherein selecting the two or more different elements comprises:
selecting a first element from one of the first plurality of elements and the second plurality of elements for a first data point of the set of data points; and
selecting a different second element from one of the first plurality of elements and the second plurality of elements for a second data point of the set of data points that is positioned next to the first data point or that has positional or non-positional commonality with the first data point.

5. The method of claim 1 further comprising:
sorting, prior to computing the checksum, the set of data points according to values defined for the first plurality of elements of the set of data points.

6. The method of claim 5, wherein sorting the set of data points comprises:
sorting the set of data points in a first order that is different than a second order with which the set of data points are stored in or accessed from the file, and wherein the checksum changes in response to the first order changing as a result of a data point being added to, removed from, or modified with different values for the first plurality of elements in the set of data points.

7. The method of claim 5,
wherein selecting the set of two or more elements comprises selecting two or more of the second plurality of elements of the set of data points after sorting the set of data points based on the first plurality of elements; and
wherein computing the checksum comprises computing the checksum based on the combination of values defined for the two or more of the second plurality of elements of the set of data points sorted in the first order.

8. The method of claim 1, wherein computing the checksum comprises:
calculating a unique value by including values defined for a first subset of the first plurality of elements and the second plurality of elements of the set of data points in the checksum computation, and by excluding values defined for a different second subset of the first plurality of elements and the second plurality of elements of the set of data points from the checksum computation.

9. The method of claim 1,
wherein selecting the set of two or more elements comprises sampling different elements of elements of data points in the set of data points that are positioned next to each other in the multi-dimensional space; and
wherein computing the checksum comprises calculating a unique value based on a value that is defined for the different elements sampled from the set of data points, and wherein the checksum changes in response to a data point being added to or removed from the set of data points.

10. The method of claim 1, wherein computing the checksum comprises:
performing a different mathematical operation on a value defined for each element of the set of two or more elements, wherein the checksum changes in response to a change in the value of any element from the set of two or more elements of the set of data points.

11. The method of claim 1 further comprising:
selecting the set of data points from a plurality of data points stored within the file; and
wherein computing the checksum comprises computing the checksum using less than all the plurality of data points stored within the file.

12. The method of claim 1 further comprising:
sampling the set of data points from a plurality of data points stored within the file based on selection criteria that repeatedly samples the same set of data points from the same plurality of data points, wherein the sampling comprises selecting a different set of data points in response to one or more of the plurality of data points stored within the file changing; and
wherein computing the checksum comprises:
computing a first checksum value in response to sampling the set of data points from a first plurality of data points stored in the file; and
computing a different second checksum value in response to sampling the set of data points from a second plurality of data points stored in the file, wherein the second plurality of data points comprises at least one different data point than the first plurality of data points.

13. The method of claim 1, wherein computing the checksum comprises:
computing a first checksum value in response to the set of two or more elements of the set of data points being defined with a first set of values; and
computing a different second checksum value in response to the set of two or more elements of the set of data points being defined with a second set of values, wherein the second set of values comprises at least one value that is different than the first set of values.

14. The method of claim 1 further comprising:
determining a size of the file; and
wherein selecting the set of two or more data elements comprises:
- selecting a first set of two or more elements from the first plurality of elements and the second plurality of elements for the checksum computation in response to the size of the file being greater than a threshold; and
- selecting a second set of two or more elements from the first plurality of elements and the second plurality of elements for the checksum computation in response to the size of the file being less than the threshold, wherein the second set of two or more elements comprises at least one different element than the first set of two or more elements.

15. The method of claim 1,
wherein the first plurality of elements comprise an x-coordinate element, a y-coordinate element, and z-coordinate element that collectively define the particular position of a data point; and
wherein the second plurality of elements comprise two or more of a red color element, a green color element, a blue color element, a chrominance element, a luminance element, a hue element, a saturation element, a brightness element, and a reflectivity element that collectively define the visual characteristics of a data point.

16. A system comprising:
one or more hardware processors configured to:
- receive a file comprising a set of data points that are distributed in a multi-dimensional space, wherein each data point of the set of data points comprises (i) a first plurality of elements that define a particular position of the data point in the multi-dimensional space, and (ii) a second plurality of elements that define visual characteristics of the data point;
- select a set of two or more elements from at least one of the first plurality of elements and the second plurality of elements;
- compute a checksum based on a combination of values defined for the set of two or more elements of each data point in the set of data points; and
- verify integrity of the file using the checksum.

17. The system of claim 16, wherein selecting the set of two or more elements comprises:
- selecting a first element from one of the first plurality of elements and the second plurality of elements for a first data point of the set of data points; and
- selecting a different second element from one of the first plurality of elements and the second plurality of elements for a second data point of the set of data points that is positioned next to the first data point or that has positional or non-positional commonality with the first data point.

18. The system of claim 16, wherein the one or more processors are further configured to:
- sort the set of data points in a first order that is different than a second order with which the set of data points are stored in or accessed from the file, and wherein the checksum changes in response to the first order changing as a result of a data point being added to, removed from, or modified with different values for the first plurality of elements in the set of data points.

19. The system of claim 16, wherein computing the checksum comprises:
- performing a different mathematical operation on a value defined for each element of the set of two or more elements, wherein the checksum changes in response to a change in the value of any element from the set of two or more elements of the set of data points.

20. A non-transitory computer-readable medium, storing a plurality of processor-executable instructions to:
- receive a file comprising a set of data points that are distributed in a multi-dimensional space, wherein each data point of the set of data points comprises (i) a first plurality of elements that define a particular position of the data point in the multi-dimensional space, and (ii) a second plurality of elements that define visual characteristics of the data point;
- select a set of two or more elements from at least one of the first plurality of elements and the second plurality of elements;
- compute a checksum based on a combination of values defined for the set of two or more elements of each data point in the set of data points; and
- verify integrity of the file using the checksum.

* * * * *